(No Model.)
R. M. HUNTER.
ELECTRIC RAILWAY.
No. 435,879. Patented Sept. 2, 1890.
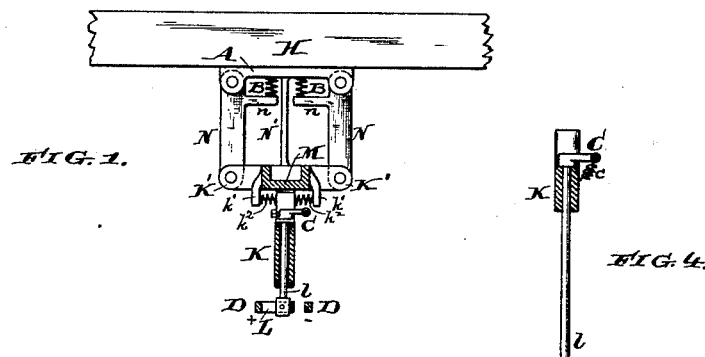
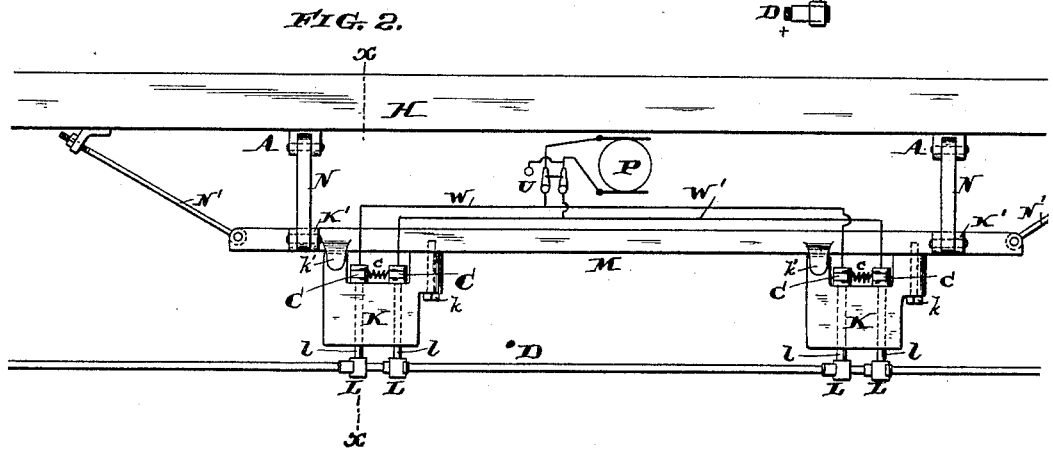
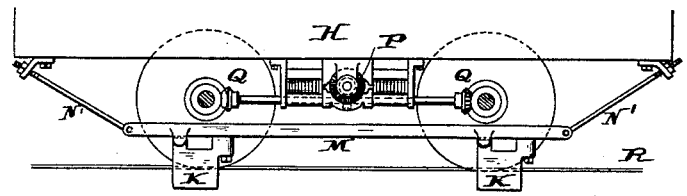
Witnesses:
Inventor:

UNITED STATES PATENT OFFICE.

RUDOLPH M. HUNTER, OF PHILADELPHIA, PENNSYLVANIA.

ELECTRIC RAILWAY.

SPECIFICATION forming part of Letters Patent No. 435,879, dated September 2, 1890.

Application filed May 20, 1890. Serial No. 352,440. (No model.)

*To all whom it may concern:*

Be it known that I, RUDOLPH M. HUNTER, of the city and county of Philadelphia and State of Pennsylvania, have invented an Improvement in Electric Railways, of which the following is a specification.

My invention has reference to electric railways; and it consists of certain improvements, which are fully set forth in the following specification, and shown in the accompanying drawings, which form a part thereof.

This application (Case No. 144) is a division of my application, (Case No. 114,) Serial No. 326,631, filed October 10, 1889, which was in turn a division of my application, Serial No. 171,625, of July 14, 1885.

My invention has particular reference to current-collecting devices for electrically-propelled vehicles, and is adapted to collect the current from a line conductor or conductors extending along the railway or line of travel of the vehicle and supply it to electric motors or other translating devices carried by or moving with the vehicle.

In carrying out my invention I provide the vehicle with an electric motor to propel it, and with a current-collecting device so arranged that it shall be moved with the vehicle and shall have freedom to lateral motion at its free end or part which comes in contact with the conductor by having the collector portion movable both laterally and about a vertical axis. Furthermore, the current-collecting device as a whole is normally supported in a vertical position by means of springs acting upon a portion pivoted to the vehicle on longitudinal axis. There may be one or more of these current-collecting devices, and they furthermore may be adapted to collect positive and negative currents. The contact devices move in connection with the conductor at a point to the rear of the vertical axis about which the current-collecting device is pivoted in its connection with the vehicle, thereby giving to the collector as an entirety a trailing connection.

The collector is hinged to the vehicle, and may consist of more than one part—that is to say, there may be a primary part movably connected to the vehicle, and a secondary part carrying the contact device supported by the primary part with freedom of lateral movement at its end where it comes in contact with the conductor.

The details may be varied greatly to suit the requirements of the case, and if two line or supply conductors are employed then a double collector-contact must be employed.

My improvements will be more fully understood by referring to the accompanying drawings, in which—

Figure 1 is a cross-section on line $x\ x$ of Fig. 2, illustrating my improved current-collecting device. Fig. 2 is a side elevation of the current-collecting device embodying my improvements. Fig. 3 is a side elevation illustrating the electrically-propelled vehicle and showing one arrangement of the current-collectors in relation to the wheels; and Fig. 4 is a modification of one portion of the collector, the view being taken similar to that shown in the lower part of Fig. 1.

H is the vehicle, and is provided with an electric motor B, which, through suitable gearing Q, connecting with the axles, enables it to be propelled over a railway, of which R represents the rails.

M is a laterally-movable frame which is supported from the vehicle H by means of links N, hinged to the lugs K' on said frame on the longitudinal axes, and these links N are hinged to frames A also by longitudinal axes; and, furthermore, said links are held normally in a vertical position by springs B acting upon lugs $n$, projecting laterally from said links N. By this means it is seen that the frame M is free to swing laterally with respect to the vehicle, and is movable about longitudinal axes. To reduce the strain upon links N, drag-bars N' may be employed, and these would be connected to the ends of the frame M and to the vehicle-body H, as indicated in Figs. 2 and 3. If the links are made short, these drag-bars may be dispensed with.

Pivoted to the frame M on vertical axes $k$ are the frames K, which frames extend rearwardly and are free to swing about said vertical axes $k$, but are normally held in line by means of the springs $k^2$, arranged between the said frames K and lugs $k'$, extending from the frame M.

The contact devices L may be of any suitable construction, and are secured to vertical shafts $l$, which extend through the plates or frames K, and are provided at their ends nearest to the vehicle with crank-arms C, which are connected to springs $c$, acting to rotate the contact devices L upon their vertical axes and maintain a contact with the conductor or conductors extending along the railway. As shown, two of these collector frames or parts K are arranged at a distance apart and one in front of the other in the line of travel of the vehicle, and both parts K are hinged to the vehicle at their forward ends and have their rear ends free and provided with the contact portion or portions proper. It will thus be seen that in this construction we have a conductor for supplying electricity extending along an electric railway, an electrically-propelled vehicle, an intermediate contact device supported independently of the supply or line conductor and maintaining a traveling connection therewith and having a free swiveling movement about a vertical axis. Furthermore, in this construction we have a contact device connected to the vehicle or car by a joint, permitting freedom of movement about a vertical axis, and a spring partaking of the said movement about a vertical axis and maintaining the traveling engagement between the contact devices and the supply-conductor. This is seen when we consider the frame or plate K movable about the vertical axis $k$ and thereby jointed to the car through frame M, and carrying the contact device L, and the spring $c$ partaking of the rotary movement about $k$. Furthermore, it is clear that we have a contact device consisting of two parts hinged together with a spring constantly holding the contact or outer part in engagement with the supply or line conductor and the contact device as a whole jointed to the vehicle or car on a vertical axis $k$ and movable freely in either direction. It is also apparent that in this construction we have an intermediate contact device having at one end a contact pressed against the supply or line conductor and at the other end a jointed connection with the vehicle or car, permitting the movement of the contact device about a vertical axis. Such construction also embodies a contact device having its weight supported by the vehicle and consisting of a primary part having freedom of movement about a vertical axis and carrying a spring-pressed contact-piece, said spring-pressed piece operating in connection with the supply or line conductor. The line of connection between the point of connection with the vehicle and the contact with the conductor is oblique, and the latter is in the rear of the former, producing a traveling effect.

When two supply or line conductors D D are employed for supplying positive and negative current, two independent spring-actuated contacts L L are employed and each of which follows the irregularities of its own conductor. In this case these two spring-actuated contacts are connected to the vehicle through a primary part. It is evident that this collecting device should be located in suitable position on the car to make contact with the line conductor or conductors, and it is constructed in such a manner that it is self-supporting and tends always to bring its parts to a normal position in line of travel of the vehicle or car.

W W' represent motor-circuits and supply-current from the contact L to the motor P, and the current-reversing switch or suitable regulator U may be employed in said motor-circuits.

It is quite evident that in place of the short rod $l$ (shown in Fig. 1) said rod may be lengthened, if desired, as indicated in Fig. 4.

It is evident that the vertical axis of the frame K is carried by the car body or frame of the vehicle in such a manner that the said frame K, carrying the spring-actuated contact device, is maintained in elastic position for the purpose of insuring contact with the conductor.

The parts may be varied as to details and may be increased or decreased in dimensions as may suit the requirements of any particular case, and hence I do not limit myself to the particular shapes of the parts shown.

Having now described my invention, what I claim as new, and desire to secure by Letters Patent, is—

1. The combination, in a railway, of an electric conductor extending along said railway, an electrically-propelled vehicle, a contact device consisting of a part hinged or flexibly connected to the vehicle and laterally movable at its free end to or from the conductor, spring devices to normally hold said part in line of travel of the vehicle, and a contact carried on the free end of said part making a connection with the conductor.

2. The combination, in a railway, of an electric conductor extending along said railway, a traveling vehicle, a contact device consisting of an intermediate part hinged to the vehicle and extending toward and making contact with the conductor, and spring devices for normally holding said contact device in a vertical plane.

3. The combination, in a railway, of an electric conductor extending along said railway, a traveling vehicle, a contact device consisting of an intermediate part hinged to the vehicle and extending toward the conductor, a spring-actuated part carried thereby and making contact with the conductor, and spring devices for normally holding said contact device in a vertical plane.

4. The combination, in a railway, of an electric conductor extending along said railway, a traveling vehicle, a contact device consisting of an intermediate part hinged to the vehicle and extending toward the conductor, a spring-actuated contact part carried thereby, making contact with the conductor, spring devices for normally holding said contact device in a vertical plane, and a spring for pressing the contact part against the conductor.

5. In an electric railway, the combination of an electric conductor extending along the railway, a traveling vehicle, and a contact device hinged to and supported by the vehicle and normally held in a vertical plane and having a spring-actuated contact part making a traveling connection with the conductor.

6. In an electric railway, the combination of an electric conductor extending along the railway, a traveling vehicle, and a contact device hinged to and supported by the vehicle and normally held in a vertical plane by a spring device and having a spring-actuated contact part making a traveling connection with the conductor.

7. In an electric railway, the combination of an electric conductor extending along the railway, a traveling vehicle, a contact device for making contact with the conductor supported by the vehicle and held in an upright position with provision for lateral movement, and a spring device to oppose lateral movement of the contact device and hold it normally in a vertical position.

8. In an electric railway, the combination of an electric conductor extending along the railway, a traveling vehicle, a contact device for making a traveling connection with the conductor connected at one end to the vehicle by a hinge-joint and with provision for lateral movement at its end adjacent to the conductor, and a spring device to normally tend to keep the contact device in a vertical plane in the line of travel of the vehicle.

9. In an electric railway, the combination of an electric conductor extending along the railway, a traveling vehicle, a rearwardly-extending contact device jointed to the vehicle at its forward end and making contact with the conductor at its rear and free end, and spring devices to normally tend to hold said contact device in a vertical plane in the line of travel of the vehicle and at all times press it against the conductor.

10. In an electric railway, the combination of an electric conductor extending along the railway, a traveling vehicle, a rearwardly-extending contact device jointed to the vehicle at its forward end on a vertical axis and making a contact with the conductor at its rear and free end, and spring devices to normally tend to hold said contact device in a vertical plane in the line of travel of the vehicle.

11. In an electric railway, the combination of an electric conductor extending along the railway, a traveling vehicle, a rearwardly-extending contact device jointed to the vehicle at its forward end on a vertical axis and making a contact with the conductor at its rear and free end, and spring devices to normally tend to hold said contact device in a vertical plane in the line of travel of the vehicle and at all times press it against the conductor.

12. In an electric railway, the combination of an electric conductor extending along the railway, a traveling vehicle, a rearwardly-extending contact device hinged to the vehicle at its forward end and having its rear or free end movable toward the conductor, and a spring to press said contact device against the conductor with an elastic pressure and also hold said contact device normally in the plane of travel of the vehicle.

13. In an electric railway, the combination of two insulated conductors extending along the railway, an electrically-propelled vehicle having an electric motor to propel it, a frame jointed to the vehicle, and two contact devices carried by the frame and extending rearwardly to the respective conductors.

14. In an electric railway, the combination of two insulated conductors extending along the railway, an electrically-propelled vehicle having an electric motor to propel it, a frame jointed to the vehicle, and two spring-actuated contact devices carried by the frame and extending rearwardly to the respective conductors.

15. In an electric railway, the combination of two insulated conductors extending along the railway, an electrically-propelled vehicle having an electric motor to propel it, a frame jointed to the vehicle at its forward end on a vertical axis, and two contact devices carried by the frame and extending rearwardly to their respective conductors.

16. In an electric railway, the combination of two insulated conductors extending along the railway, an electrically-propelled vehicle having an electric motor to propel it, a frame jointed to the vehicle at its forward end on a vertical axis, and two spring-actuated contact devices carried by the frame and extending rearwardly to the respective conductors.

In testimony of which invention I have hereunto set my hand.

R. M. HUNTER.

Witnesses:
ERNEST HOWARD HUNTER,
MAURICE H. HOLMES.